United States Patent [19]

Müller

[11] Patent Number: 4,535,275
[45] Date of Patent: Aug. 13, 1985

[54] BRUSHLESS D-C MOTOR SYSTEM WITH IMPROVED COMMUTATION CIRCUIT

[75] Inventor: Rolf Müller, St. Georgen, Fed. Rep. of Germany

[73] Assignee: Papst-Motoren GmbH & Co., KG, St. Georgen, Fed. Rep. of Germany

[21] Appl. No.: 447,688

[22] Filed: Dec. 7, 1982

[30] Foreign Application Priority Data

Dec. 23, 1981 [DE] Fed. Rep. of Germany ....... 3150922
Dec. 23, 1981 [DE] Fed. Rep. of Germany ....... 3150923

[51] Int. Cl.³ .............................................. H02P 6/02
[52] U.S. Cl. .................................. 318/254; 318/138; 318/439; 363/98
[58] Field of Search ................... 318/138, 254 A, 254, 318/439; 363/98

[56] References Cited

U.S. PATENT DOCUMENTS

| | | | |
|---|---|---|---|
| 3,047,789 | 7/1962 | Lowry | 363/96 |
| 3,898,544 | 8/1975 | Tanikoshi | 318/439 X |
| 3,986,086 | 10/1976 | Muller | 318/254 A X |
| 4,030,005 | 6/1977 | Doeman | 318/138 |
| 4,164,690 | 8/1979 | Muller | 318/254 A |
| 4,296,362 | 10/1981 | Beasley | 318/254 X |
| 4,376,261 | 3/1983 | Heide et al. | 318/254 |
| 4,403,174 | 9/1983 | Miyazaki et al. | 318/138 X |
| 4,409,526 | 10/1983 | Yamauchi et al. | 318/138 X |

FOREIGN PATENT DOCUMENTS

0040484 11/1981 European Pat. Off. .
2071939 9/1981 United Kingdom .

*Primary Examiner*—William M. Shoop, Jr.
*Assistant Examiner*—Bentsu Ro
*Attorney, Agent, or Firm*—Frishauf, Holtz, Goodman & Woodward

[57] ABSTRACT

To provide for reliable commutation of a single-strand or single-line winding (25) connected in the diagonal of a transistor bridge circuit (40, 40') having four transistors (70–73) which are alternately rendered conductive in accordance with a Hall-IC rotor position sensor (32) affected by the field of a permanent magnet rotor (13), time delay capacitors (64, 66; 87) are connected to charge current sources, for example high-resistance resistors (59, 63; 88, 90, 95) to delay turn-ON of respective transistors of the bridge permitting current flow through the winding in a first direction after commutation from the other transistors (71, 72) of the bridge which are being turned OFF or blocked, so that a finite time interval or gap of no current flow is provided to reliably prevent possible short-circuit currents across the power supply buses (44, 45) if the inherent switching characteristics of the transistors are longer than the commutation interval. The capacitors are connected to a rapid-discharge circuit, for example through diodes (62) or the inherent semiconductor, such as a transistor (54) in a Hall generator-integrated circuit combination. If transistors of inherent sufficient capacity, and switching delay for switching ON are used, external capacities (87) may not be needed, the internal capacity of the transistor switching providing for sufficient time delay, with the switching-OFF being assisted by the aforementioned diode or discharge circuit (54, 89).

33 Claims, 5 Drawing Figures

BRUSHLESS D-C MOTOR SYSTEM WITH IMPROVED COMMUTATION CIRCUIT

Reference to related patent, assigned to the assignee of the present application, the disclosure of which is hereby incorporated by reference: U.S. Pat. No. 4,030,005, DOEMEN.

Reference to related U.S. Pat. No. 3,898,544, TANIKOSHI.

The present invention relates to a brushless d-c motor system, and more particularly to a permanent magnet d-c motor, suitable for example as a fan drive, utilizing controlled semiconductor switches to effect commutation of direct current through armature windings of the motor.

BACKGROUND

Direct-Current d-c motors which have an armature winding, energized in alternate directions from a direct current source under control of semiconductor switches, typically transistors, have previously been proposed. Switching-over of the polarity of the d-c supply source to the coil, to provide a pulsed field is effected under control of a rotor position sensor, which may be magnetically responsive to the magnet of the rotor itself, for example a Hall sensor, usually coupled to an integrated circuit amplifier to form a Hall-IC combination. The sensor controls energization of the armature winding via a controlled bridge circuit. This may be a full-wave or half-wave bridge.

The referenced U.S. Pat. No. 3,898,544, Tanikoshi, illustrates a two-wire or two-strand, four-pulse motor in which the two armature strands or wires are each connected and driven by a full-wave bridge circuit. Each bridge circuit is selectively energized by controlling transistors therein, the transistors, in turn, being controlled from two output signals of a Hall generator. The output signals from the Hall generator have an aproximately sinusoidal wave shape, that is, they rise only slowly, so that they will reach the switching voltage of the associated transistor only some time after having been subjected to the magnetic field from the rotor. At the commutation time instant, thus, a gap between current flow will result since the transistors will not switch instantaneously as the polarity of the rotor, to which the Hall generator is exposed, changes. The current gap, that is, the interruption of current flow, must have a certain time of sufficient length to prevent short circuits through the transistors with reliability and assurance. In order to have a sufficiently long current gap, transistors must be used which have similar threshold voltages, the Hall gnerators must have similar output signal characteristics, and the rotor must be magnetized, at least in the portion controlling the Hall generator, with approximately sinusoidal magnetization. All these conditions are cumulative and require expensive matching of components, and yet cannot be achieved at all times.

THE INVENTION

It is an object to improve operation of a motor in which controlled semiconductors are connected in a bridge circuit which is reliable, prevents short circuits within the motor due to faulty commutation with assurance and reliability, while being inexpensive and easy to construct, and capable of being placed or fitted within the confined space of a compact motor system, for example suitable to drive a fan.

Briefly, transistor turn-off circuit elements, such as turn-off transistors, are connected to the control inputs of the bridge circuit; the blocking circuit elements have associated therewith timing circuit components, such as capacitors, which reliably and effectively prevent the bridge transistors from unblocking for a predetermined time interval after the blocking action has become effective. The time interval is determined, additionally, by controlling application of the conduction blocking signal for the timing period in dependence on the timing means to command a finite time interval of non-conduction of the bridge circuit upon commutation of current therethrough. The stability of operation of the timing means is provided by an essentially constant current source, fed from the power supply to the motor; for most applications, a high resistance connection from the power supply to the capacitor, to provide a high resistance charge circuit therefor, is an inexpensive and reliable combination of controlling the timing interval as well as stability of operation of the timing element formed by the capacitor.

The system, then, will reliably cause gaps in current flow upon change of polarity of the rotor at a given reference position, for example opposite a Hall generator, which gaps can be dimensioned, in time, in accordance with design requirements by mere change of the capacity of a capacitor. The system is independent of individual variations in threshold or triggering voltages of the semiconductor switches, typically transistors, the type of the rotor position sensor, for example a Hall generator, an optical generator, or the like, or the shape of the magnetization of the rotor magnet. All these variables, which are difficult to control under mass production conditions, need no longer be considered since the gap in current flow is established by a timing circuit in combination with a blocking circuits which blocks connection of the bridge transistors.

The system utilizes only few electronic circuit elements and all of those of small size which are readily available; thus, the elements can be combined with a motor in a compact construction. This is particularly important and desirable when the system utilizes a two-pulse motor. In spite of the small size and the minimum number of components, reliability of operation is insured.

Figure 1:
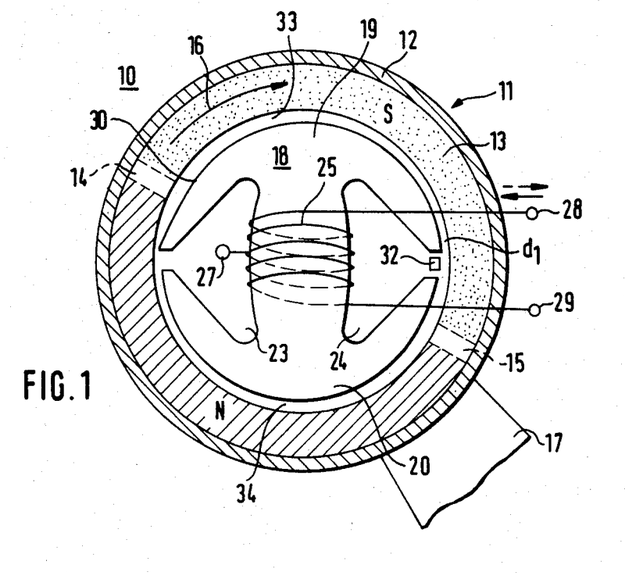
FIG. 1 is a schematic representation of a motor designed for direct drive of a fan, utilizing a two-pulse brushless d-c motor having an auxiliary reluctance torque, the motor structure, in general being similar to that of the referenced and incorporated U.S. Pat. No. 4,030,005, DOEMEN.

A motor structure suitable for use in the present invention is illustrated in FIG. 1, in which a two-pulse brushless d-c motor 10 is shown, as described in detail in the referenced U.S. Pat. No. 4,030,005.

Definition of terms:

"Two-pulse": The number of current pulses supplied to the armature winding for each rotation of the rotor over 360°-electrical (el). For example, the motor illustrated in FIG. 1 will receive, during a full revolution, only two current pulses, which are, essentially, of the same time length. One current pulse will flow through stator winding 25 in one direction, and the other current pulse in the opposite direction.

"Single-strand" or "single-wire": The motor has only a single winding. Such a motor can also be referred to as a single-phase motor.

"Two-pole": The rotor has two poles.

The present invention is suitable for motors of two poles or 2n-poles; for example, is equally suitable for four-pole, six-pole, etc. motors; it is also suitable for four-pulse or six-pulse motors, for example. If a four-pulse system is used, the circuit of FIG. 2 must be duplicated, and two Hall-IC's must be placed on the stator at suitable distance from each other, for example spaced by 90°-el.

The motor 10 of FIG. 1 is an external rotor motor having a two-pole external rotor 11. Rotor 11 is radially magnetized, as shown in customary manner by N and S. Magnetization is, preferably, trapezoidal, with narrow magnetic gaps 14, 15. These gaps may have a width of only about 5°-10°-el between the poles thereof. Trapezoidal magnetization results in practically constant magnetic flux density over almost a whole pole width, e.g. over about 170° to 175°-el, and thereafter a monotonic drop-off of magnetization. For a full discussion, the referenced U.S. Pat. No. 4,030,005 is referred to.

Rotor 11 is surrounded by a pot-shaped cover 12, for example made of deep-drawn steel. The bottom of the steel cover—not shown—is coupled to the shaft (not shown) of the rotor. The magnet 13 is secured within the pot-shaped cover 12. The magnet 13, usually, is a rubber-type magnet. The pot-shaped cover 12 has fan or ventilator blades or vanes 17 of the fan welded thereon. The vanes 17 are driven by the motor 10 when it rotates. Only one fan blade 17 is shown for clarity in the drawing. The position of practically constant magnetic flux density or magnetic induction for the North pole is shown by hatching in FIG. 1; for the South pole, the region of practically constant magnetic flux density is shown stippled. Arrow 16 indicates the direction of rotation.

The stator 18 has two salient poles. The upper pole 19 is separated from the lower pole 20 by slots 23, 24. The slots 23, 24 receive the motor or armature winding 25, the terminals of which are carried outside of the motor and are shown at 28, 29. A rotor position sensor 32 is positioned at the slot opening 24. The rotor position sensor 32 is shown in form of a Hall IC, which provides only a single ouput signal. Other types of sensors can be used, for example an optical sensor, other magnetically responsive sensors, or the like.

An air gap 33 is formed between the stator pole 19 and rotor 11 which matches in shape with the air gap 34 opposite the pole 20. The air gaps are not cylindrical or uniform; rather, and as explained in the referenced U.S. Pat. No. 4,030,005, the air gap, starting from slot 23, and in the direction of rotation, increases to a maximum 30, and from then on decreases monotonically to a minimum $d_1$. This shape of the air gap results in a reluctance torque—as explained in the aforementioned referenced U.S. Pat. No. 4,030,005, which is particularly suitable and desirable and provides for smooth and quiet running of the motor.

The invention is not restricted to an external rotor motor of the particular type shown, although it is particularly suitable in connection therewith; the invention is equally applicable to cylindrical internal rotor motors, or other types of motors, such as axial air gap motors. The shape of the reluctance torque depends on the shape of the air gap, as well as on the type of magnetization of the rotor 11. The slots 23, 24 preferably are skewed. The motor 10 of FIG. 1 is illustrated only as a preferred example for an understanding of the subsequent circuit, with which the motor forms a system although, as described, internal rotor motors or other motors, may be used therein.

Direct current pulses will flow in winding 25, in cyclical alternation, first from terminal 28 to terminal 29 and then, after a pause or current gap, from terminal 29 to terminal 28. A current pause or current gap must occur between two succeeding pulses. This current gap is necessary to maintain the efficiency of operation at a high level and, further, to prevent short circuits if the power supply includes a bridge circuit.

Figure 2:
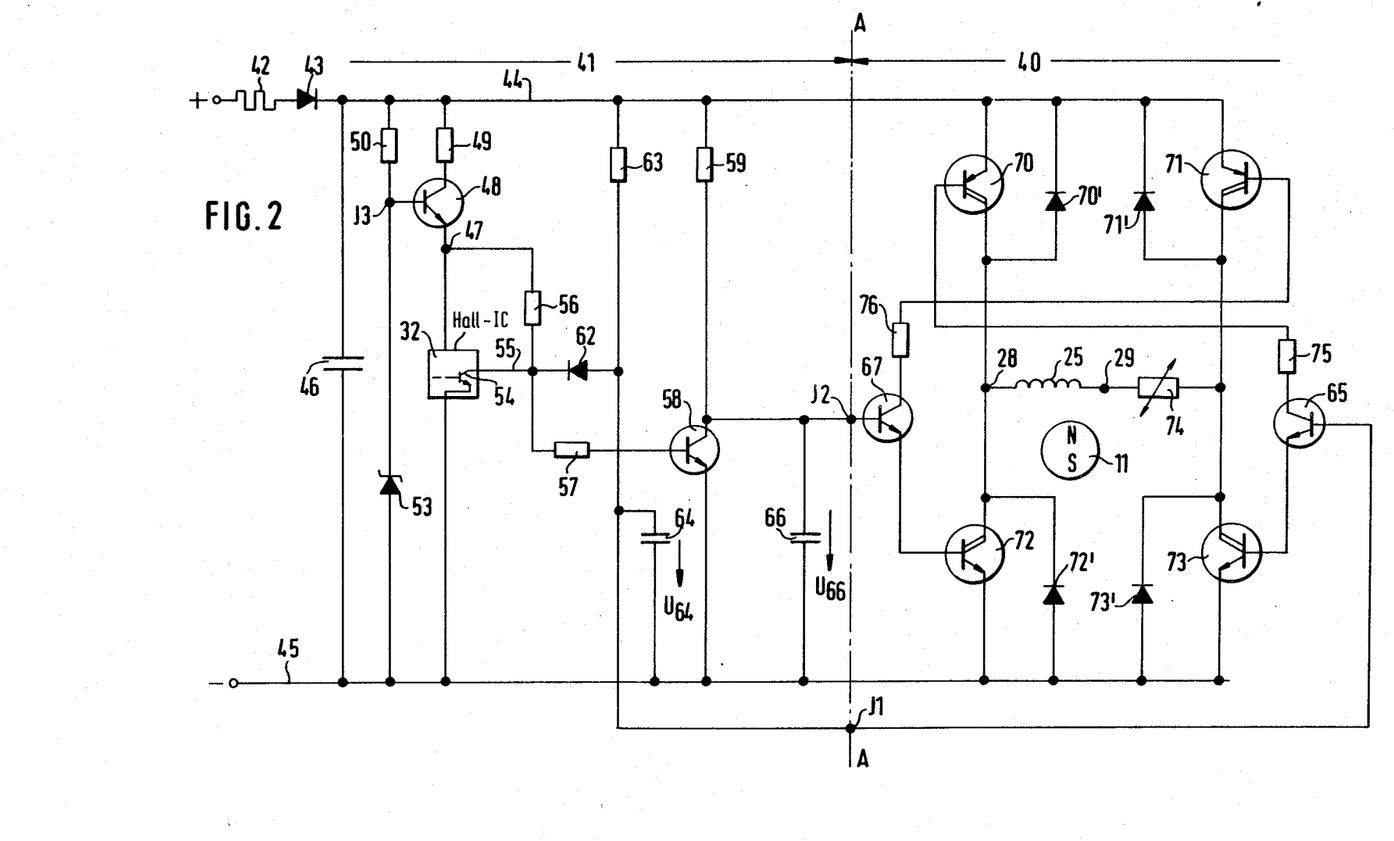
FIG. 2 is a circuit diagram of the motor system utilizing a full-wave bridge.

The circuit with which the motor of FIG. 1 forms a system is illustrated in FIG. 2, in which the motor 10 is shown again in schematic, equivalent form. The rotor 11 is shown schematically, and winding 25 adjacent thereto, in magnetically coupled induction with rotor 11.

At the right side of the line A—A of FIG. 2, a full-wave circuit 40 using four power semiconductor switches and two driver stages is shown; at the left side of the line A—A, the control circuit 41 is shown which controls the respective switching of the semiconductor switches of the bridge circuit 40. Circuit 41 can be considered to be a commutation circuit or current flow selection circuit or current flow control circuit.

Energy for motor operation is derived from a direct current source which may, for example, have 24, 48 or 60 V, supplied between positive and negative terminals. One of the terminals, as shown the positive terminal, is connected through a meltable resistor 42, functioning as a fuse, and a diode 43, preventing damage due to possible reverse polarity connection of the terminals to a positive supply bus 44. The negative terminal is connected directly to negative supply bus 45. A filter capacitor 46 of high capacity, for example of between 20 to 100 $\mu$F is connected between buses 44, 45.

A Hall integrated circuit (IC) 32 forms a rotor position sensor. It is connected to the emitter terminal 47 of a transistor 48, the collector of which is connected over a resistor 49 to bus 44. The base J3 of transistor 48 is connected through a resistor 50 to bus 44 and to the cathode of a Zener diode 53, the anode of which is connected to negative bus 45. The emitter 47 will, then, have a constant voltage of for example 5.6 V applied thereto.

The emitter 47 provides a constant voltage terminal to which other low-power devices also may be connected, such as a speed control circuit or a current limiting circuit for the motor. The circuit in accordance with the present invention itself can, however, operate without a current limiting circuit up to a relatively substantial motor power output.

The Hall-IC 32 has its other terminal connected to negative bus 45. The output of the Hall-IC includes an npn-transistor 54 which is an open collector transistor, which, as shwon, forms the output terminal 55 of the Hall-IC 32. Output 55 of the Hall-IC 32 is connected via an operating resistor 56 to the constant voltage at the emitter 47; and further through a resistor 57 to the base of a phase-inverting npn-transistor 58. Transistor 58 has its emitter connected to negative bus 45, and its collector through collector resistor 59 to positive bus 44. Resistor 59 has a high resistance value. The voltage of bus 44, as noted, in operation is substantially higher than the voltage at the emitter 47 of transistor 48.

The output 55 of the Hall IC is further connected to the cathode of a diode 62, the anode of which is connected through a high-resistance resistor 63, forming a second operating resistor for the Hall-IC 32, to the positive bus 44. The anode of the diode 62, additionally, is connected to a junction J1 which forms a control terminal for the bridge circuit 40. The collector of the phase inverting transistor 58 is connected to a junction J2 which forms another output terminal of the control circuit and another input terminal to the bridge circuit 40. Bridge circuit 40 has, as input elements, driver transistors 65, 67.

In accordance with a feature of the invention, the junctions J1 and J2 each are connected to respective time delay capacitors 64, 66, the other terminals of which are connected to the negative bus 45.

The full-wave bridge circuit 40 has input transistors 65, 67 connected, as stated, to the junctions J1, J2. The power circuit of the full-wave bridge has four Darlington transistors. The upper branches include two pnp transistors 70, 71, and the lower branches two npn transistors 72, 73. The emitters of transistors 70, 71 are connected to positive bus 44; the emitters of transistors 72, 73 are connected to negative bus 45. The collectors of the transistors 70, 72 are connected together and to terminal 28 of the stator winding 25. The collectors of transistors 71, 73 are connected together and connected through a positive temperature coefficient resistor 74 with the terminal 29 of stator or armature winding 25. The base of transistor 70 is connected through resistor 75 with the collector of the driver transistor 65, the emitter of which is connected directly to the base of the transistor 73. The base of transistor 71 is connected over a base resistor 76 with the collector of driver transistor 67, the emitter of which is connected directly to the base of the transistor 72.

Figure 3:
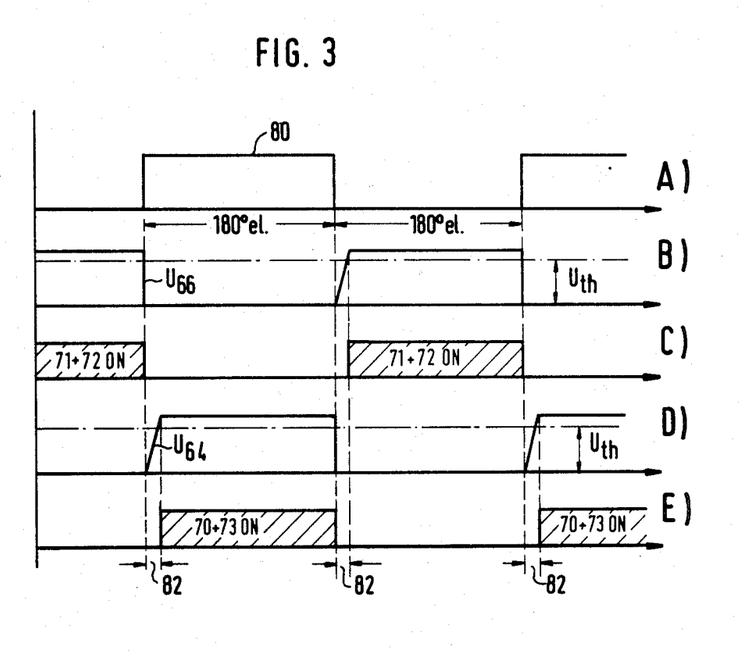
FIG. 3 is a series of timing graphs used to explain the operation.

Operation, with reference to FIGS. 2 and 3: Let it be assumed that the driver transistor 67 is conductive, which will cause conduction of the power transistors 71, 72 in the bridge. Current will flow from positive bus 44 over transistor 71, the resistor 74 which is a positive temperature coefficient (PTC) resistor, through the stator winding 25 in the direction from right to left—with respect to FIG. 2—and to the negative bus 45 through the transistor 72. Upon conduction of transistor 65, current will flow in the reverse direction through bridge transistors 70, 73, and through the armature or stator winding 25 towards the right. Thus, current in the stator winding 25 will reverse direction from terminal 29 to 28, and, then, from terminal 28 to 29. The PTC resistor 74 prevents motor current from increasing to an excess value in case the rotor should be blocked. Upon heating, the resistance value of the PTC resistor will increase to such an extent that current in winding 25 will be reduced to a safe level.

If both driver transistors 65 and 67 would be rendered conductive simultaneously, all the bridge transistors 70–73 would become conductive simultaneously as well, resulting in short-circuit connection between the positive and negative buses 44, 45. This, of course, would lead to immediate destruction of power transistors 70–73. The circuit, thus, must provide for reliable assurance that the control signals for the driver transistors 65 and 67 are so spaced, in time, that overlap of conduction of the two transistors is impossible.

In accordance with the present invention, circuit elements are provided to reliably insure time gaps between the conduction of transistors 65, 67, respectively, so that short circuits are effectively prevented. These elements include the delay capacitors 64, 66 (FIG. 2) and capacitance 87 (FIG. 4) or the equivalent thereof.

The Hall-IC 32 provides square-wave pulses 80 at its output, see FIG. 3, graph A. These ouputs are "high" during 180°-el, causing transistor 54 thereof to be blocked; during the subsequent 180°-el, the output will be "low", that is, transistor 54 in the Hall-IC is conductive. The "high" and "low" signals can also be termed 1-signals and 0-signals for convenience.

When the output 55 is a 1-signal, transistor 58 will be rendered conductive by connection through the relatively high resistance resistor 57. The delay capacitor 66, thus, will rapidly discharge, for example within one microsecon. Transistor 58 thus acts as a discharge element for the capacitor 66, and thus blocks driver transistor 67, and with it the bridge power transistors 71, 72. Graph B of FIG. 3 shows the voltage $u_{66}$ on capacitor 66; graph C of FIG. 3, in hatched portion, shows the conduction of the transistors 71, 72.

When the output at line 55 becomes high, or a 1-signal, diode 62 blocks, so that charge current will flow over the relatively high resistance resistor 63 to the delay capacitor 64, to effectively charge capacitor 64—see graph D of FIG. 3, voltage $u_{64}$. When the voltage at capacitor 64 reaches the threshold level $u_{th}$ of about 2 V, which is roughly the combined base-emitter voltages of three transistors—driver transistor 65 becomes conductive, thus causing conduction of transistors 70 and 73.

Conduction of the transistors 70, 73 provides energy to the armature winding, causing the rotor to rotate. After rotation of 180°-el, the voltage at the output of the Hall-IC 32 becomes a 0-signal, that is, the transistor 54 therein becomes conductive. The delay capacitor 64 can discharge over diode 62 and the transistor 54, used herein as a discharge path, very rapidly, for example within 1 microsecond, so that the previously conductive driver transistor 65 is rapidly blocked, thus blocking transistors 70 and 73. Simultaneously with blocking of the transistor 65, phase reversal transistor 58 is blocked over the relatively high resistance resistor 57. In accordance with the previously referred to graph B of FIG. 3, the delay capacitor 66 can now be charged over the relatively high resistance resistor 59 at an effectively constant current, that is, essentially linearly. When the threshold voltage $u_{th}$, of for example 2 V is reached, driver transistor 67 will become conductive, causing transistors 71, 72 to become conductive.

As can clearly be seen from FIG. 3; gaps 82 will occur between conduction of the respective bridge transistor pairs 70, 73, and 71, 72, respectively. In a four-pole motor, operating at for example 3000 rpm, 180°-el corresponds to a time of 5 ms. The duration of the gaps 82, then, will be preferably selected to fall between 0.1 to 0.5 ms, that is, substantially longer than the discharge time of the capacitors 64, 66, which need be only a few microseconds.

The relatively high resistance resistors 59 and 63 connected to the relatively high operating voltage, for example 24 or 48 V, form, for all practical purposes, a constant current source, and thus provide for essentially linear charge of the delay capacitors 64, 66. This results in more precise connection delay time than charging in accordance with an exponential function, which would be the result if the connection would be to the emitter terminal 47 of transistor 48. Furthermore, transistor 48 is less loaded, so that a smaller current capacity transistor can be used.

The internal transistor 54 of the Hall-IC 32 is utilized in the circuit as a discharge element for the delay capacitor 64. This is a particularly desirable and hence preferred solution. Of course, a separate transistor could also be used, which, however, introduces an additional element, and hence costs. The decoupling element in form of resistor 57 and diode 62 is necessary in the circuit as shown in order to insure that when the transistor 54 blocks, transistor 58 becomes immediately conductive, and capacitor 66 can immediately discharge, while the capacitor 64 can charge over resistor 63 only slowly. Without the decoupling network formed by resistor 57 and diode 62, the voltage at capacitor 64 would be limited to the base-emitter threshold voltage of the transistor 58.

Overrunning or free-wheeling diodes 70', 71', 72', 73' are connected in parallel with the driver transistors, as well known, with reverse polarity.

Example: For an operating voltage of 48 V, with a four-pole, single-armature winding motor of 15 W, the following values are suitable:

voltage at emitter 47 of transistor 48: 5.6 V
Hall-IC 32: TL 170
resistor 56: 2.2 kΩ
resistors 57, 59, 63: 100 kΩ
resistors 75, 76: 22 kΩ
capacitors 64, 66: 10 nF.

Figure 4:
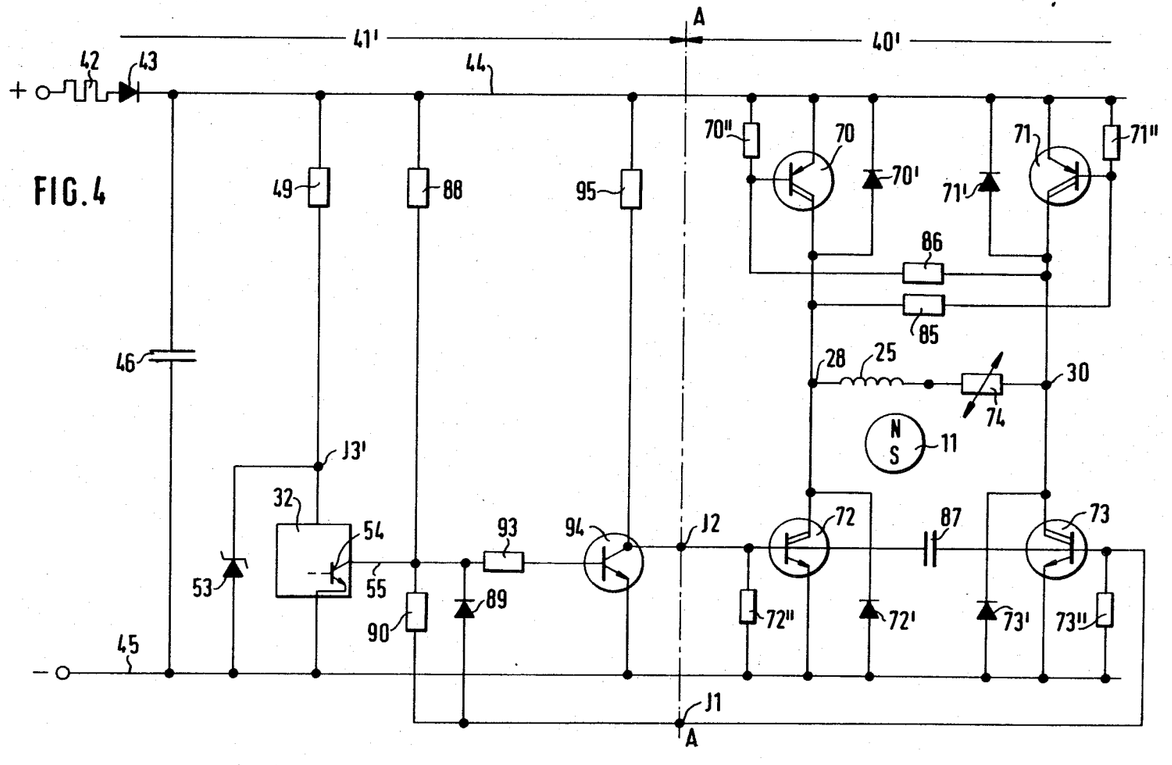
FIGS. 4 and 5 illustrate two other embodiments of the invention, in which elements similar to those of FIG. 2 have been given the same reference numerals.

Embodiment of FIG. 4: The motor system, and the operation thereof, can be improved while using fewer circuit elements, as shown in the system of FIG. 4. If the invention is applied to fans or ventilators, operating the system with a lesser number of components is of substantial advantage since the space available for their placement is very limited.

The full-wave bridge circuit 40' is constructed, essentially, the same way as the bridge 40 of FIG. 2, using four Darlington transistors 70–73 with parallel connected free-wheeling diodes 70'–73'. Base-emitter resistors 70"–73" are likewise provided, which are not shown in FIG. 2. Bridge terminal 28 is connected to the stator winding 25; a PCT resistor 74 is connected to winding terminal 29, the other terminal of which is connected to a bus or junction 30 connecting the collectors of the Darlington transistors 71, 73, and forming one of the diagonal terminals of the bridge, as also shown in FIG. 2.

The upper—with respect to FIG. 4—bridge transistors 70, 71 are controlled differently from the control in accordance with FIG. 2: Terminal 28 is connected through resistor 85 with the base of transistor 71 and, conversely, terminal 30 of the bridge is connected through resistor 86 to the base of transistor 70.

In accordance with the present invention, a capacitance is provided between the bases of the transistor 72, 73. This capacitance may be the inherent capacitance of the transistor 72, 73, which then should be selected to have substantially high inherent capacitances; or an external capacitor may be provided. FIG. 4 shows the equivalent capacitance or an external capacitor at 87.

The control portion of the system, shown at 41', uses a Hall-IC; any other type of sensor, for example an optical sensor, may be used. The present invention is, however, particularly suitable for operation with sensors having digital output signals in the form of signals 80, FIG. 3, that is, signals which are not representative of the analog value of the magnetic flux of the field controlling the sensors, or do not provide analog outputs of other physical parameters.

A zener diode 53, with a Zener voltage of about 5 V for example, is connected in parallel to the Hall-IC 32. The Hall-IC has one terminal connected directly to negative bus 45, the other terminal being connected through the resistor 49 to positive bus 44. Hall-IC 32 is identical to that described in connection with FIG. 2. Terminal J3' provides constant voltage.

The output 55 of the Hall-IC 32 is connected through a resistor 88 to positive bus 44, and to the cathode of a diode 89, the anode of which is connected to a junction J1, forming one output of the control system. A resistor 90 is connected in parallel with diode 89.

The output terminal 55 is further connected through resistor 93 to the base of an npn transistor 94, the emitter of which is directly connected to negative bus 45, and the collector with terminal J2 and the base of the bridge transistor 72. A collector resistor 95 is connected to positive bus 44. Transistor 94 is a phase inversion transistor and is utilized as a control element to block the control input of transistor 72; the internal transistor 54 of the Hall-IC 32 is used as the control transistor to block the control input of the bridge transistor 73.

The output control terminals of the control portion 41' are designated J1, J2. This corresponds to FIG. 2, where likewise, the output terminals of the control portion 41 are designated J1, J2.

Operation: Bridge transistor 72 is controlled by the phase inversion stage 93, 94, 95; bridge transistor 73 is directly controlled from the Hall-IC 32. When transistor 94 is blocked, bridge transistor 72 will be conductive. At that point, the voltage at terminal 28 is approximately that of negative bus 45. Consequently, a voltage drop will occur on resistors 71" and 85, and the base of transistor 71 will receive a voltage which causes transistor 71 to become conductive. Thus, the voltage of its collector, namely terminal 30, will be approximately that of the positive bus 44, and power can flow from bus 44 through transistor 71 to terminal 30, through PTC resistor 74 to terminal 29 of armature winding 25, to the armature 25 towards the left—with respect to FIG. 4—and through the conductive transistor 72 to the negative bus 45.

In the reverse case, when transistor 73 is conductive and transistor 72 is blocked, current will flow over resistor 86 to the base of transistor 70 to cause conduction thereof, and motor current through the armature 25 will flow in reverse direction.

For reliable operation of bridge circuits of this type, it is of substantial importance that the transistors, which have their collectors connected, and are of respectively different conductivity type, e.g., transistors 70 and 72, should never be conductive at the same time, since the current flowing between positive and negative buses, then, will be short-circuit current. The power dissipated in the transistors in such a case can reach dangerous levels, leading to their destruction.

In accordance with a feature of the invention, short-circuit currents are prevented by rapidly disconnecting or blocking transistors 72, 73 over rapidly conductive semiconductor paths, with very low differential internal resistance. Thus, the time constant, which is formed by these/internal resistances with the base emitter, and the base collector capacitances of the transistors 72, 73, will be low. The conductive path for transistor 73 is formed by the diode 89 and the conductively switched transistor 54 within the Hall-IC 32. The conductive transistor 94 forms the semiconductor path for switching off transistor 72.

In accordance with a feature of the invention, the turn-ON mode of operation of the transistors is delayed, and effected by base currents which flow through relatively high resistance resistors, and thus cause a relatively slow rise of base voltage. For example, if transistor 94 is turned OFF, base current will flow over resistor 95 into the base of the bridge transistor 72. The base of the bridge transistor 72, however, just in advance of this instant of time, was at the voltage level of the emitter. The base current, thus, must first overcome the storage effect of the base emitter capacitance, and, primarily, the storage effect of the base-collector capacitance before the transistor 72 can become conductive.

The transistor 73, likewise, is turned ON with delay. When the transistor 54 within the Hall-IC 32 is blocked, the base of the transistor 73 must have sufficient current applied thereto over resistors 88, 90 to overcome the inherent storage time delay within the capacitances of the transistor 73 before it will become conductive. Just before transistor 54 and the Hall-IC 32 block, the voltage at the base of the transistor 73 was essentially the emitter voltage. The base current, thus, must first overcome the inherent capacitance and storage effects within the transistor.

The inherent capacitance values of modern transistors are relatively small. The delay effect of turn-ON condition of the transistor with respect to blocking or turn-OFF condition is not specifically apparent. It is, however, sufficient, usually, in order to prevent direct short-circuit currents through the transistors 70-72 or 71-73, respectively. Yet, the effect cannot always be entirely excluded and may be interfered with by stray and other circuit effects which cannot always be suppressed, for example capacitances between conductors or connecting lines, resistances in junctions and connecting lines, and variations within the elements themselves due to manufacturing tolerances, particularly tolerance variations within the transistors being used.

The delay effect can be simply and easily enhanced, so that reliable delay of turn-ON of the transistors is effected with respect to the turn-OFF timing thereof by connecting a capacitor 87 between the bases of the transistors 72, 73. The capacitance of such a capacitor may be in the order of, for example, about 100 pF, or more.

Operation of capacitor 87: Let it be assumed that the transistor 54 within the Hall-IC is conductive; transistors 94 and 73 are blocked, and transistor 72 is conductive. If, now, upon rotation of the rotor of the motor, the Hall-IC switches its switching state, that is, becomes blocked, transistor 94 will become conductive almost simultaneously, and rapidly essentially short-circuits the base-emitter path of the bridge transistor 72. This causes the base-emitter voltage $U_{BE}$ on transistor 72 to drop to 0.1 to 0.3 V, from a previously existing level of about 1.2 to 1.4 V. This rapid change of voltage on the base of transistor 72 is transferred via capacitor 87 to the base of transistor 73. Consequently, the base voltage at transistor 73 may drop below that of the negative bus 45, holding transistor 73 in blocked condition, reliably, although current flows over resistors 88, 90 to the base of transistor 73 with a tendency to render the transistor 73 conductive. This current, however, first must recharge the capacitor 87 by the voltage difference of two times $U_{BE}$ before the transistor 73 can become conductive. Thus, for a relatively long time, both transistors 72, 73, and hence transistors 70, 71, are reliably in blocked or non-conductive state.

Conversely, when transistor 54 of the Hall-IC changes over from its blocked to its conductive state, capacitor 87 first must recharge in analogous manner, but now in the reverse direction. The base-emitter voltage $U_{BE}$ of the previously conductive transistor 73 which, up to then, was between, about 1.2 to 1.4 V, for example, is dropped by the transistor 54 within the Hall-IC 32 over the diode 89 to about 0.8 V in very short time, causing rapid blocking of transistor 73. Resistor 90 further drops the base-emitter voltage, slightly slower, to about 0.1 to 0.3 V. The rapid change in voltage is transferred by capacitor 87 from the base of the transistor 73 to the base of transistor 72, so that transistor 72, in spite of the base current flowing over resistor 95, remains blocked. Capacitor 87 again must recharge in reverse direction by a voltage of about $2 \times U_{BE}$ over resistor 95 before the bridge transistor 72 can become conductive. Capacitor 87, thus, has a dual function for two switching steps, delaying both of them—namely delaying turn-ON of bridge transistor 72 as well as turn-ON of bridge transistor 73.

Resistor 93 decouples the output voltage of the Hall-IC 32 at its output 55 with respect to the small base-emitter voltage of transistor 94. The output voltage of the Hall-IC is relatively high, as required.

Resistors 88, 90, 93 preferably are so dimensioned that they provide essentially approximately the same current in the base of transistor 73 as the resistor 95 for the base of transistor 72. The delay periods upon turn-ON of the transistors 72 and 73 then will be essentially the same.

The bases of the two bridge transistors 72 and 73 are connected by the capacitor 87 so that, when one transistor pair is turned OFF, the other transistor pair is turned ON with a relatively large time gap or time interval, which may be in the order of between 1/100 to about 1/10 of the switching period cycle. The duration of this pause or gap can be selected by suitable selection of the capacitor 87 and/or of the resistors 88, 95. This pause also decreases the thermal loading of the transistors of the bridge circuit 40', so that operating efficiency as well as the lifetime of the motor and the motor control system are high.

The cross connection of the bases of the transistors 70, 71 with the collectors of the transistors 72, 73 provide for direct control of conduction of the transistors 70, 71, so that the driver transistors 65, 67 (FIG. 2) can be omitted, thus decreasing the required circuit components.

The circuit of FIG. 4 has a number of advantages: The PTC resistor 74 protects the motor as well as the bridge circuit system 40' with respect to overloading and, for example, blocked-rotor condition of the motor. If excessive loading of the rotor 11 no longer occurs, or rotor 11 is no longer blocked, the overload protection will automatically revert to normal condition, so that, upon removal of overload, the motor will operate normally.

Even if the bridge circuits 40, 40' should be overloaded, the control systems 41, 41' therefor, connected at junctions J1, J2, remain operative and are not affected.

The bridge circuit 40', in spite of use of digital signals 80 (FIG. 3) is so controlled that, when the first transistor pair is turned OFF, the subsequent transistor pair will be turned ON with a relatively long and selectable pause or time gap, which can be selected to be in the order of from 1/100 to 1/10 of the switching cycling duration, for example.

The fuse resistor 42 is preferably connected in the circuit for additional protection.

Capacitor 46 is used in order to store energy released upon commutation of motor current in the stator winding, and to suppress voltage peaks within the current supply system.

In an example, circuit elements for FIG. 4 were used as follows: Operating voltage 48 V, but may vary between 40 to 60 V; the motor was a 10 W motor operating at 3000 rpm.

Hall-IC 32: TL 170
capacitor 46: 47 μF
resistor 49: 4.7 kΩ
resistor 88: 33 kΩ
resistor 90: 12 kΩ
resistor 93: 27 kΩ
resistor 95: 68 kΩ
resistors 85, 86: 47 kΩ each
diode 89: 1N4148
transistor 94: BC546
capacitor 87: 3300 pF
transistors 70, 71: BD680
transistors 72, 73: BD679.

Figure 5:
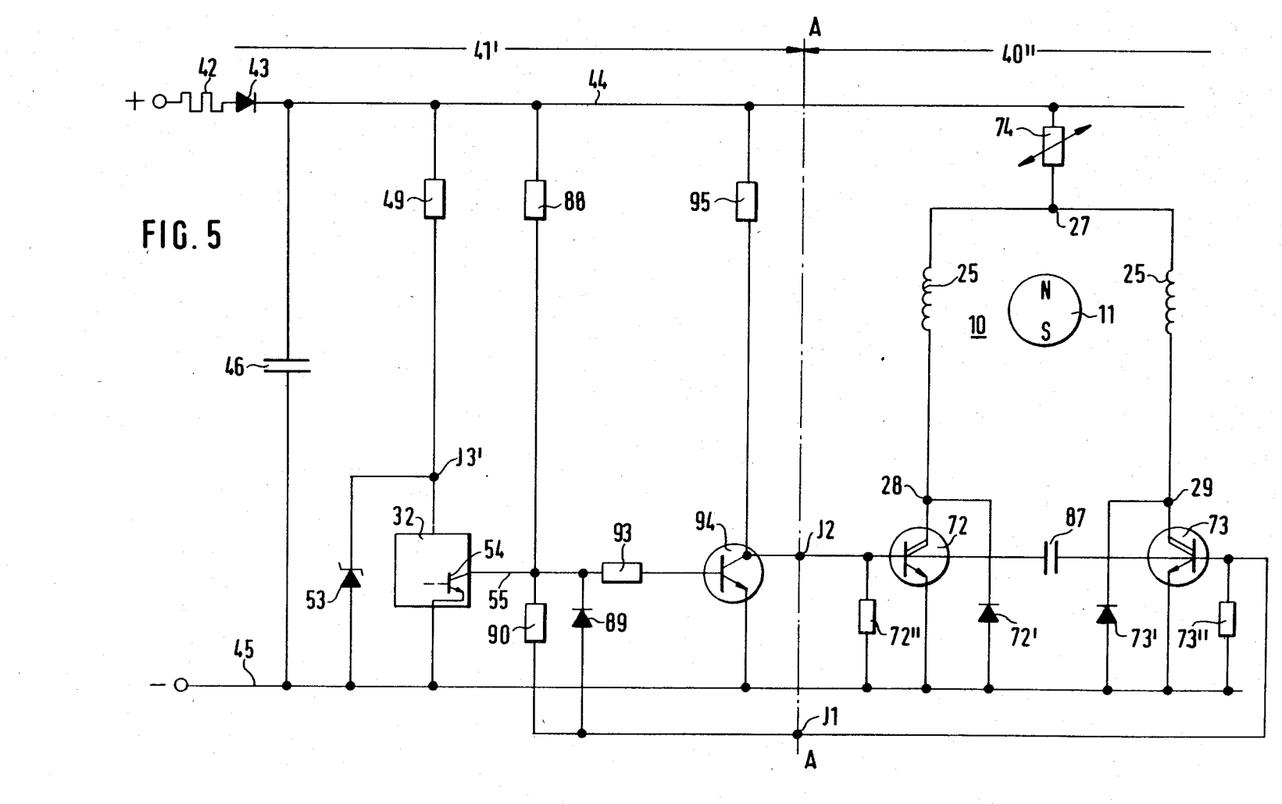

FIG. 5 shows a modification of FIG. 4. The control circuit 41' of FIG. 5 is identical with the control circuit 41' of FIG. 4. The power semiconductor arrangement 40" of FIG. 5 comprises only two Darlington-transistors 72 and 73 the circuit arrangement of which as well as their connection to control circuit 41' also correspond to FIG. 4. Also, between the bases of their input transistors, a capacitor 87 is provided. The typical values indicated for FIG. 4 do likewise apply to FIG. 5.

The motor 10 of FIG. 5 is a two-strand or two-phase motor, and its winding 25 has a center tap 27 (FIG. 1) which is connected via a PTC-resistor 74 to positive bus 44. Terminal 28 of winding 25 (cf FIG. 1) is connected to the collector of transistor 72, and the other terminal 29 is connected to transistor 73. Thus, when transistor 72 conducts, current flows in one direction through the upper half of winding 25 shown in FIG. 1 which represents one strand or phase. When transistor 73 conducts, current flows in the opposite direction through the lower half of winding 25 in FIG. 1 which represents the other strand or phase. As can be understood easily, the net result will be zero if both transistors 72 and 73 do conduct at the same time since the magnetic fields of the upper and lower parts of coil 25 (FIG. 1) will cancel each other so that coil 25 will be heated to no avail, and motor efficiency will be reduced.

Therefore, also in the two-strand arrangement of FIG. 5, a conduction gap will be valuable during which neither of transistors 72 and 73 will be conducting in the range around the instant of commutation.

Operation of FIG. 5: This was already described with reference to FIG. 4. When phase reversal transistor 94 becomes conductive, it blocks transistor 72 at once. This causes the base-emitter voltage $U_{BE}$ of transistor 72 to drop to 0.1 ... 0.3 V from a previously existing level of about 1.2 ... 1.4 V. This rapid change of potential is transferred via capacitor 87 to the base of transistor 73. Consequently, the base potential of transistor 73 may drop below that of negative bus 45, holding transistor 73 in blocked condition, reliably, although current flows over resistors 88, 90 to the base of transistor 73 with a tendency to render the latter conductive. This current, however, must first alter the charge on capacitor 87 by a voltage difference of $2 \times U_{BE}$, before transistor 73 can become conducting. Thus, for a relatively long time, both transistors 72, 73 are reliably held in a non-conductive state.

Conversely, when transistor 73 is blocked during commutation, the inverse situation obtains as explicitly described in connection with FIG. 4.

If rotor 11 is blocked, this causes a large increase in motor current. This current heats PTC-resistor 74 so that it assumes a high resistance value and thus protects motor 10 from overload. When rotor 11 is no longer blocked, resistor 74 can cool down, and the motor 10 can be re-started.

The motor system has simple construction and provides excellent efficiency and reliability in operation. Especially the embodiment of FIG. 4, which has a minimum number of electronic components, is particularly suitable for use with fan or blower apparatus which is included in other electronic apparatus. Frequently, space limitations require fan or blower structures having a length of only about 38 mm (about 1½"), so that only minimum space for circuit elements is available. Yet, the overall motor-circuit system combination permits fitting motors of the given power capability within this small space.

Various changes and modifications may be made, and features described in connection with any one of the figures and embodiments may be used with any of the others. If some loss of efficiency can be tolerated, and for extremely small installations where space is at a premium, half-bridge circuits may be used, while still employing the inventive concept.

I claim:

1. Brushless d-c motor system having
   a stator having at least one winding;
   a permanent magnet rotor in magnetic inductive position with respect to the stator;
   means for sensing rotor position and for deriving a signal representative of the position of the rotor with respect to the stator;
   power supply buses for connection to a direct current source;
   a four transistor bridge circuit having four transistors arranged as two bridge-halves, of which each half includes two of the four transistors, and carries current through the winding in a respective one of two opposite directions,
   said four transistor bridge circuit forming a full bridge, and being connected to the terminals of said winding,
   said full bridge circuit being further connected to and controlled by the rotor position sensing means;
   two capacitance means;
   first and second voltage changing means, connected to the capacitance means for changing the voltage on the associated capacitance means, each bridge-half including a respective capacitance means,
   one of said voltage changing means forming a capacitance charging means and the other of said voltage changing means forming a capacitance discharge means;
   each of said capacitance means being connected to the respective bridge-half such that the voltage of the capacitance means determines the degree of conductivity of at least one of the two transistors of the respective bridge-half;

the change of voltage on the capacitance means, effected by the associated first voltage changing means causing the respective bridge-half to become conductive, and the change in the voltage on the capacitance means effected by the associated second voltage changing means causing the respective bridge-half to become non-conductive or to block; and wherein the transistors of the four transistor bridge circuit, the capacitance means, and the first and second voltage changing means are so dimensioned relative to each other that the voltage change effected by each of the first voltage changing means is slower than that effected by the second voltage changing means, to produce a time gap between switching OFF of one bridge-half and subsequent switching ON of the other bridge-half.

2. System according to claim 1, wherein the first voltage changing means comprises charge resistors connected to change the charge state of the capacitance means, said resistors having resistance values such that the current flowing therethrough for charging said capacitance means during the respective time interval is essentially at a constant level.

3. System according to claim 2, wherein the capacitance means comprises two capacitors respectively connected to the control input terminals of the bridge circuit and effectively connected in series and having a common connection, the common connection being connected to one of said power buses.

4. System according to claim 2, wherein the transistors of the bridge circuit include switching transistors; and the capacitance means includes the inherent base-emitter and base-collector capacitances of the respective transistors.

5. System according to claim 2, wherein the bridge circuit includes control input terminals connected to and controlled by the rotor position sensing means; and
wherein said capacitance means are formed by a delay capacitor connected across the control input terminals of the bridge circuit.

6. System according to claim 1, wherein the means for deriving a signal representative of the rotor postion comprises
a Hall integrated circuit element having a transistor output stage;
and wherein the transistor output stage of the Hall-IC elements forms part of the second voltage changing means and is coupled to the half-bridges for providing, selectively, blocking voltages to a control input terminal of the transistor of the respective half-bridge.

7. System according to claim 1, including a phase inversion transistor connected to the means for deriving a signal representative of position of the rotor, and connected to a control input terminals of the bridge circuit.

8. System according to claim 7, further including a high resistance decoupling resistor connected between the input of the phase inversion transistor and the output of the rotor position sensing means.

9. System according to claim 7, further comprising decoupling elements connected between the phase inversion transistor and the capacitance means.

10. System according to claim 1 including a diode (62, 89) connected between the output of the rotor position signal deriving means and the capacitance means to provide for changing the charge state of the capacitance means as a function of rotor position, as sensed by the rotor position signal deriving means.

11. System according to claim 1, further including a voltage regulator connected to the power supply buses and providing regulated electrical energy to the rotor position signal deriving means at a voltage level which is below the voltage level between the power supply buses;
and means for controlling stability of operation of the charging means comprising high resistance connections connected to the power supply buses at a voltage level which is higher than the stabilized voltage provided for the rotor position signal deriving means.

12. System according to claim 1, including
the means for controlling stability of operation of the charging means comprises a high resistance connection between the capacitance means and the power supply buses, the resistance of said connection being sufficiently high to provide for essentially constant current flow upon charging of the respective capacitance means.

13. System according to claim 1, wherein the first and second voltage changing means are respectively dimensioned for providing a delay of unblocking conduction of the transistors of the bridge circuit, which delay is substantially longer than the time required to cause blocking of transistors of said bridge under control of th means for deriving the rotor position representative signal.

14. System according to claim 13, wherein the time delay is, at the most, about 10% of the theoretically possible turn-ON time of the associated transistor of the bridge circuit.

15. System according to claim 1, further including a positive temperature coefficient (PTC) resistor (74) serially connected with the winding (25) to limit the overall motor current in case of interference with free rotation of the rotor thereof.

16. Compact fan or ventilator comprising
an external rotor motor;
including the d-c motor system defined in claim 1;
wherein the stator and said at least one continuous winding is located within the rotor, and the rotor, externally, surrounds the stator, and fan blades (17) are provided, directly secured to said external rotor.

17. System according to claim 1, wherein the rotor has essentially trapezoidal-shaped magnetization.

18. System according to claim 1, wherein the means for deriving a rotor position signal is coupled to and controls said first and second voltage changing means.

19. System accoding to claim 1, wherein each capacitance means has a first and a second voltage changing means connected thereto.

20. Brushless direct-current motor system having
a stator winding having at least two winding strands;
a permanent magnet rotor in magnetic inductive position with respect to the stator;
means for sensing rotor position and for depriving a signal representative of the position of the rotor with respect to the stator;
power buses for connection to a direct current source;

said two winding strands being each series-connected with a power transistor means for alternate connection of the winding strands to the power buses;

each power transistor means having a control input terminal;

a control circuit connected to and controlled by said rotor position sensing means and having its output connected to said control input terminals, and comprising means for delaying conduction of a respective power transistor means upon commutation of current from one of said winding strands to the other and after blocking of the other of the power transistor means for a time interval sufficient to insure a finite time gap of current flow through said power transistor means, said delaying means including capacitance means connected between said control input terminals for affecting flow of base current through the respective power transistor means being controlled to reach conductive state, and hence delaying conduction thereof;

means (88, 90, 95) for supplying a current to said capacitance means; and means (54, 89, 94) for rapidly changing the potential of at least one electrode of said capacitance means (87) under control of said rotor position sensing means (32) to cause rapid blocking of the respective power transistor means upon commutation of current to the other power transistor means.

21. System acccording to claim 20, wherein the means for deriving a signal representative of the rotor position comprises a Hall integrated circuit element (32) having a transistor output stage;

and wherein the transistor output stage of the Hall-IC element forms part of said means for rapidly changing the potential of at least one of the electrodes of said capacitance means to cause rapid blocking of the respective transistor means upon commutation of current to the other power transistor means.

22. System according to claim 20, wherein the means for rapidly changing the potential of at least one electrode of said capacitance means includes a phase inversion transistor connected to the means for deriving a signal representative of position of the rotor, and connected to one of said control input terminals of said power transistor means.

23. System according to claim 22, further including a high resistance decoupling resistor connected between the input to the phase inversion transistor and the output of the rotor position sensing means.

24. System according to claim 20, wherein a charging circuit for said capacitance means is provided and a diode is connected between the output of the rotor position sensing means and said capacitance means to provide for changing the charge state of the capacitance means as a function of rotor position, as sensed by the rotor position sensing means.

25. System according to claim 24, further including a voltage regulator connected to the power supply buses and providing regulated electrical energy to the rotor position sensing means (32) at a voltage level which is below the voltage level between the power buses;

and wherein said charging circuit comprises high resistance connections connected to the power supply buses at a voltage level which is higher than the stabilized voltage provided for said rotor position sensing means.

26. System according to claim 20, wherein the rotor has essentially trapezoidal-shaped magnetization.

27. Brushless d.c. motor system having a stator having at least one winding;

a permanent magnet rotor in magnetic inductive position with respect to the stator;

means for sensing rotor position and for deriving a signal representative of the position of the rotor with respect to the stator;

power supply buses for connection to a direct current source;

a full bridge circuit having four power transistors means arranged as two bridge-halves of which each contains two of the power transistor means, each bridge-half carrying current through the winding in a respective one of two opposite directions, said full bridge circuit being connected to the terminals of said winding;

a pair of power transistor means of said full bridge circuit having a control input terminal each, said pair comprising one power transistor means of each bridge half;

a control circuit connected to and controlled by said rotor position sensing means and having its output connected to said control input terminals;

and comprising, in accordance with the invention, means for delaying conduction of a respective power transistor means of said pair upon commutation of current from one bridge half to the other and vice versa and after blocking of the other of the power transistors means of said pair for a time interval sufficient to insure a finite time gap of current flow through said pair of power transistor means, said delaying means including capacitance means connected between said conrol input terminals for affecting flow of base current through the respective power transistor means of said pair being controlled to reach conductive state, and hence delaying conduction thereof;

means for supplying a current to said capacitance means; and means for rapidly changing the potential of at least one electrode of said capacitance means under control of said rotor position sensing means to cause rapid blocking of the respective power transistor means of said pair upon commutation of current to the other power transistor means of said pair.

28. System according to claim 27, wherein the means for deriving a signal representative of the rotor position comprises a Hall integrated circuit element (32) having a transistor output stage;

and wherein the transistor output stage of the Hall-IC element forms part of said means for rapidly changing the potential of at least one of the electrodes of said capacitance means to cause rapid blocking of the respective transistor means upon commutation of current to the other power transistor means.

29. System according to claim 27, wherein the means for rapidly changing the potential of at least one electrode of said capacitance means includes a phase inversion transistor connected to the means for deriving a signal representative of position of the rotor, and connected to one of said control input terminals of said power transistor means.

30. System according to claim 29, further including a high resistance decoupling resistor connected between the input to the phase inversion transistor and the output of the rotor position sensing means.

31. System according to claim 27, wherein a charging circuit for said capacitance means is provided and a diode is connected between the output of the rotor position sensing means and said capacitance means to provide for changing the charge state of the capacitance means as a function of rotor position, as sensed by the rotor position sensing means.

32. System according to claim 31, further including a voltage regulator connected to the power supply buses and providing regulated electrical energy to the rotor position sensing means at a voltage level which is below the voltage level between the power buses;

and wherein said charging circuit comprises high resistance connections connected to the power supply buses at a voltage level which is higher than the stabilized voltage provided for said rotor position sensing means.

33. System accofing to claim 27, wherein the rotor has essentially trapezoidal-shaped magnetization.

* * * * *